(12) United States Patent
Bumm et al.

(10) Patent No.: US 7,944,550 B2
(45) Date of Patent: May 17, 2011

(54) SYSTEM AND METHOD FOR DETECTING LOCAL MECHANICAL STRESS IN INTEGREATED DEVICES

(75) Inventors: Lloyd Bumm, Norman, OK (US); Daminda Dahayanaka, Norman, OK (US); Philip V. Kaszuba, Essex Junction, VT (US); Leon Moszkowicz, Milton, VT (US); James A. Slinkman, Montpelier, VT (US)

(73) Assignee: International Business Machines Corporation, Armonk, NY (US)

( * ) Notice: Subject to any disclaimer, the term of this patent is extended or adjusted under 35 U.S.C. 154(b) by 569 days.

(21) Appl. No.: 12/039,830

(22) Filed: Feb. 29, 2008

(65) Prior Publication Data

US 2009/0219508 A1 Sep. 3, 2009

(51) Int. Cl.
*G01B 11/16* (2006.01)

(52) U.S. Cl. ........... 356/32; 324/754.05; 324/755.07; 324/750.22; 73/760

(58) Field of Classification Search .......... 356/32–35; 324/766, 762, 765, 750–755, 755.07; 73/760, 73/777

See application file for complete search history.

(56) References Cited

U.S. PATENT DOCUMENTS

| | | | |
|---|---|---|---|
| 5,065,103 A | | 11/1991 | Slinkman et al. |
| 6,538,462 B1* | | 3/2003 | Lagowski et al. ............ 324/765 |
| 7,084,661 B2* | | 8/2006 | Thompson et al. ........... 324/766 |
| 7,202,691 B2* | | 4/2007 | Lagowski et al. ............ 324/765 |
| 7,659,734 B2* | | 2/2010 | Hawthorne et al. .......... 324/719 |
| 2001/0028460 A1 | | 10/2001 | Maris et al. |
| 2003/0175945 A1 | | 9/2003 | Thompson et al. |
| 2006/0267622 A1 | | 11/2006 | Lagowski et al. |
| 2009/0139312 A1* | | 6/2009 | Hawthorne et al. ............ 73/105 |

OTHER PUBLICATIONS

Nonnenmacher, M.; Boyle, M. P. O.; Wickramasinghe, H. K., Kelvin probe force microscopy. Applied Physics Letters 1991, 58, (25), 2921-2923. [KPFM].
Weaver, J. M. R.; Wickramasinghe, H. K., Semiconductor characterization by scanning force microscope surface photovoltage microscopy. Journal of Vacuum Science & Technology, B: Microelectronics and Nonometer Structures 1991, 9, (3), 1562-5. [SPV-KPFM].
Kikukawa, A.; Hosaka, S.; Imura, R., Vacuum compatible high-sensitive Kelvin probe force microscopy. Review of Scientific Instruments 1996, 67, (4), 1463-7. [PLL control in KPFM].
Jacobs, H. O.; Knapp, H. F.; Stemmer, A., Practical aspects of kelvin probe force microscopy. Review of Scientific Instruments 199, 70, (3), 1756-1760. [trace/retrace in KPFM].

* cited by examiner

*Primary Examiner* — L. G Lauchman
(74) *Attorney, Agent, or Firm* — Cantor Colburn LLP; Michael LeStrange

(57) ABSTRACT

A method of detecting local mechanical stress in integrated devices is provided, the method comprising: enabling the detection of a photovoltage difference between a scan probe device and a surface portion of an integrated device, the scan probe device being configured to deflect in response to the photovoltage difference; measuring the deflection of the scan probe device in response to the photovoltage difference between the scan probe device and the surface portion of the integrated device; and calculating a local stress level within the integrated device by determining a local work function of the surface portion of the integrated device based upon the deflection of the scan probe device.

25 Claims, 3 Drawing Sheets

SYSTEM AND METHOD FOR DETECTING LOCAL MECHANICAL STRESS IN INTEGREATED DEVICES

BACKGROUND OF THE INVENTION

1. Field of the Invention

This invention relates to a system and method for detecting local mechanical stress in integrated devices.

2. Description of Background

Current in-line production stress metrology is conducted only at a wafer monitor level. For design purposes, the stress state in active device regions has been inferred from electrical data. It is clear that stress is one of the major factors in current design and manufacture of Very Large Scale Integrated (VLSI) devices. Mechanical stress in deep sub-micron silicon (Si) technologies can drastically alter carrier mobility (e.g., approximately 25% dependent on device geometry) and further affect device performance.

SUMMARY OF THE INVENTION

The shortcomings of the prior art are overcome and additional advantages are provided through the provision of a method of detecting mechanical stress in integrated devices, the method comprising: enabling the detection of a photovoltage difference between a scan probe device and a surface portion of an integrated device, the scan probe device being configured to deflect in response to the photovoltage difference; measuring the deflection of the scan probe device in response to the photovoltage difference between the scan probe device and the surface portion of the integrated device; and calculating a local stress level within the integrated device by determining a local work function of the surface portion of the integrated device based upon the deflection of the scan probe device.

The shortcomings of the prior art are overcome and additional advantages are further provided through the provision of a method of detecting mechanical stress in integrated devices, the method comprising: irradiating with a first laser signal and a second laser signal at a surface portion of an integrated device enabling the detection of a photovoltage difference between a scan probe device and the surface portion of the integrated device, the scan probe device being suspended over the integrated device; measuring the deflection of the scan probe device in response to the photovoltage difference; and calculating a local stress level within the integrated device at the surface portion by determining a local work function of the surface portion of the integrated device based on the deflection of the scan probe device.

The shortcomings of the prior art are overcome and additional advantages are even further provided through the provision of an apparatus for detecting mechanical stress in integrated devices, the apparatus comprising: an integrated device having a surface portion with a local work function; a scan probe device suspended over the integrated device; an optical controller configured for enabling the detection of a photovoltage difference between the integrated device and the scan probe device, the scan probe device being configured to move in response to the photovoltage difference; a scan probe detector configured for measuring the movements of the scan probe device in response to the photovoltage difference; and a processing unit in signal communication with the scan probe detector, the processing unit being configured for calculating a local stress level within the integrated device by determining the local work function of the surface portion of the integrated device based upon the deflection of the scan probe device.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution for detecting and measuring local mechanical stress in integrated devices.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
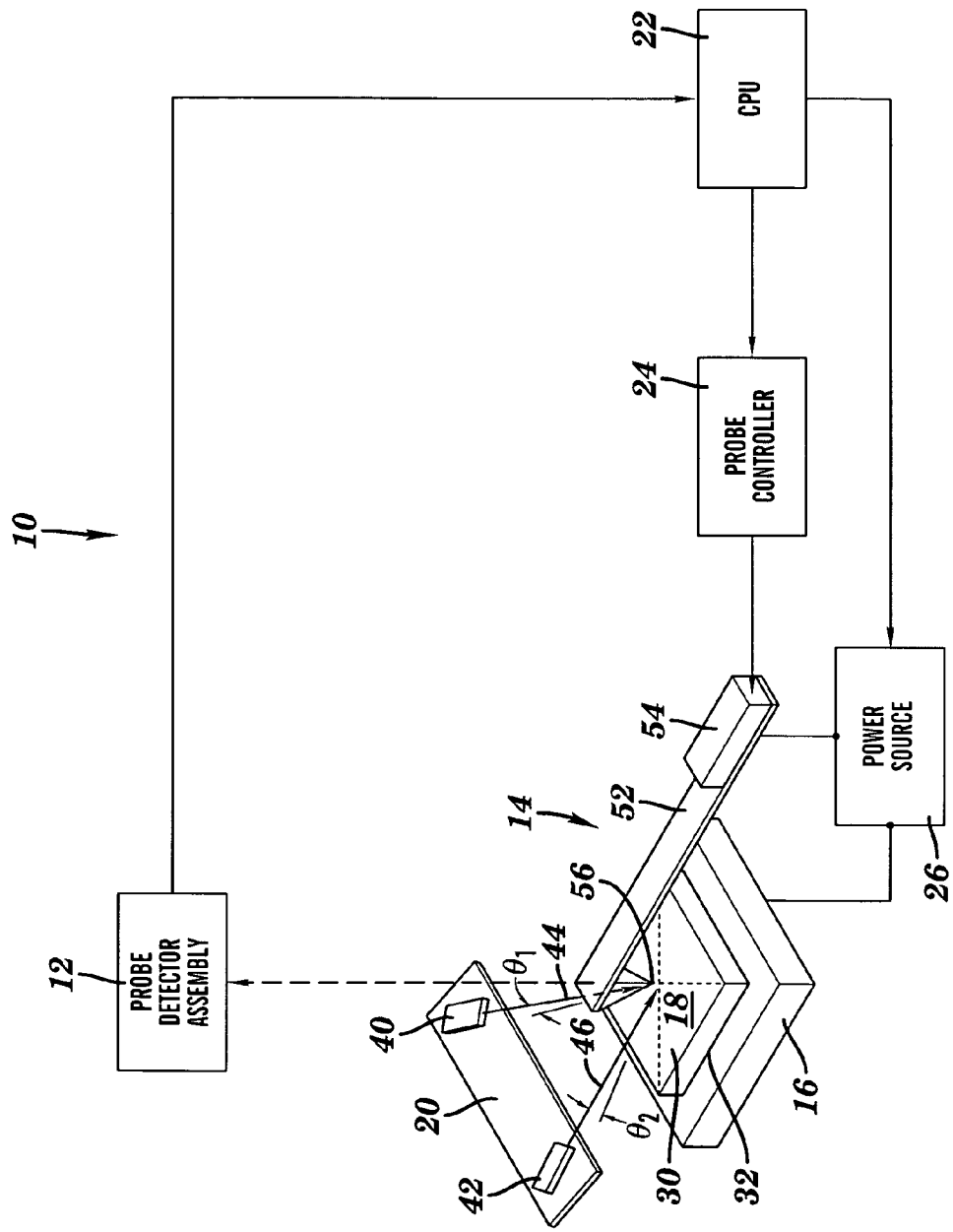
FIG. 1 illustrates a schematic diagram of a scanning Kelvin photovoltage microscopy system in accordance with one exemplary embodiment.

The detailed description explains the preferred embodiments of the invention, together with advantages and features, by way of example with reference to the drawings.

DETAILED DESCRIPTION OF THE INVENTION

The present invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known or conventional components and processing techniques are omitted so as to not necessarily obscure the present invention in detail. The examples used herein are intended merely to facilitate an understanding of ways in which the invention may be practiced and to further enable those of skill in the art to practice the invention. Accordingly, the examples should not be construed as limiting the scope of the invention.

The inventors herein have recognized that enabling the detection of a differential surface photovoltage between an integrated device (e.g., memory device) and a scan probe device permits the characterization of local mechanical stress on approximately a 100 nanometer (nm) scale (or less), which advantageously facilitates the design, manufacture and failure analysis of current Very Large Scale Integrated (VLSI) technologies. The inventors herein have further recognized that coherent light incident on silicon (a common material for fabricating integrated devices) enables the detection of a change in the local band-gap and thus in the local work function (or more generally to the change in surface photovoltage (SPV)) of the same, which advantageously permits the measurement of the change in local work function thereby permitting the deconvolution of the local stress level on the silicon-based device. The characterization of stress in actual device structures permits optimization of design for varying device sizes and allows the diagnosis of failing devices, which will become more apparent with the discussion below.

For a better understanding of the invention and its operation, turning now to the drawings, FIG. 1 is a schematic diagram illustrating the basic elements of one exemplary embodiment of the present invention. More specifically, FIG. 1 illustrates a scanning kelvin photovoltage microscopy (SKPVM) system 10 in accordance with one exemplary embodiment of the present invention. The system 10 comprises a probe detector assembly 12 generally suspended over a scan probe device 14, a platform stage 16, and effectively over a sample 18 of semiconductor material (e.g., silicon), which sits atop the platform stage 16. The system 10 further comprises an optical controller 20 positioned proximate to the sample 18 in such a way that it does not interfere mechanically with the scan probe device 14. The system further comprises a central processing unit (CPU) 22 in electrical communication with the probe detector assembly 12, a probe controller 24, and a power source 26.

In accordance with one embodiment, the sample 18 is a semiconductor device of any conventional type. The sample 18 is generally made up of a multiplicity of devices and/or electronic circuits created on a wafer made of semiconducting material, such as, for example, silicon, along with various compound semiconductors and fabricated through various well known photographic and/or chemical processing steps in accordance with one embodiment. It is contemplated that other conventional techniques of processing and manufacturing the sample and materials for fabricating the same can be used in accordance with exemplary embodiments of the present invention. The sample 18 has a work function at different locations thereof, which is dependent on the material of the sample 18 in addition to the state of stress in those locations of the sample 18. These stresses may be formed on the sample during, for example, fabrication processes or due to damage from use. In any event, some portions of the sample 18 may have a spatially varying component of stress, thus causing the work function at those portions, hereinafter referred to as the local work function, to change.

In accordance with one embodiment, the stage platform 16 supports the sample 18 and is configured to move the sample 18 below the scan probe device 14 along the x-axis and/or y-axis. In doing so, the scan probe device 14 may scan a top surface 30 of the sample 18 in the x-axis and y-axis while a bottom surface 32 abuts the stage platform 16 as shown. In one exemplary embodiment, the stage platform 16 is configured to move along the x-axis and along a single line of the top surface 30 of the sample 18 to acquire a surface topography of the single line and again along the same single line of the top surface 30 of the sample 18 to enable detection of a photovoltage difference between the scan probe device and the area of interest of the sample 18, which is enabled by the optical controller 20. The photovoltage difference is created due to the differences in work function between the scan probe device 14 and the sample 18.

In accordance with one embodiment, the optical controller 20 is in a facing relationship with the sample 30 and scan probe device 14 and located proximate thereto. The optical controller 20 is configured to irradiate light at the sample 18 in accordance with one exemplary embodiment. In one exemplary embodiment, the optical controller 20 includes a first light-emitting source 40, a second light-emitting source 42, and a processor (not shown) for controlling the first light-emitting source 40 and the second light-emitting source 42. The first light-emitting source 40 and the second light-emitting source 42 are configured for irradiating the sample with a first light signal, which is indicated by arrow 44 in FIG. 1, and a second light signal, which is indicated by arrow 46 in FIG. 1, respectively. The first light signal 44 and the second light signal 46 couple locally to a first wave vector in the sample and a second wave vector in the sample respectively, depending on polarization of the light signals. In accordance with one non-limiting exemplary embodiment, the first light-emitting source 40 is a first laser source configured to irradiate the sample 18 with a first laser signal while the second light-emitting source 42 is a second laser source configured to irradiate the sample 18 with a second laser signal. Of course, other light emitting sources may be used in accordance with exemplary embodiments of the present invention and should not be limited to the configuration described above.

Figure 2:
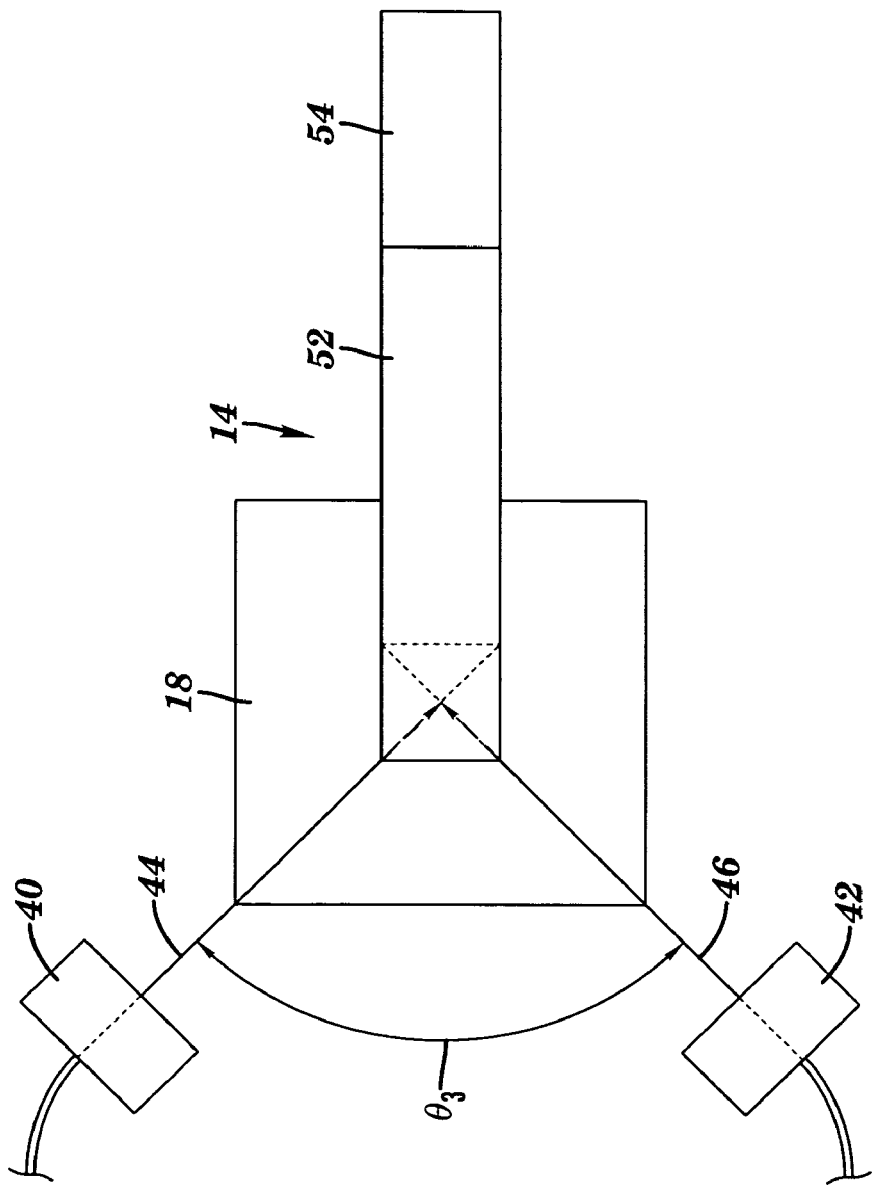
FIG. 2 illustrates a top perspective view of a first light-emitting source and a second light-emitting source being arranged at an angle $\theta_3$ with respect to each other and at a respective angle of incidence to the sample in FIG. 1 in accordance with one exemplary embodiment.

The first light-emitting source 40 is arranged at a first angle of incidence $\theta_1$ with respect to a surface portion of the sample 18 in accordance with one exemplary embodiment. In one non-limiting exemplary embodiment, the first angle of incidence $\theta_1$ is approximately at a Brewster angle (e.g., approximately 10-20 degrees) with respect to the surface portion of the sample 18. In doing so with transverse magnetic polarized light, the largest amount of light from the first light-emitting source 40 can be absorbed by the sample 18, thus reducing undesirable reflection, which provides for a more accurate reading. As better shown in FIG. 2, the first light-emitting source 40 has an angle $\theta_3$ with respect to the second light-emitting source 42. In accordance with one exemplary embodiment for example, $\theta_3$ can be chosen to be 90 degrees. And in accordance with another exemplary embodiment for example, $\theta_3$ can be chosen to be zero degrees.

The second light-emitting source 42 is arranged at a second angle of incidence $\theta_2$ with respect to the surface portion of the sample 18 in accordance with one exemplary embodiment such that the second light-emitting source 42 and the first light-emitting source 44 are positioned to direct light at any given time to the same location of the sample 18. In one non-limiting exemplary embodiment, the second angle of incidence $\theta_2$ is positioned approximately at a Brewster angle (e.g., approximately 10-20 degrees) with respect to the sample 18. It is contemplated that the first angle of incidence $\theta_1$ of the first light-emitting source 40 can be different from the second angle of incidence $\theta_2$ of the second light-emitting source 42 and should not necessarily be limited to the configuration as described.

The first light-emitting source 40 and the second light-emitting source 42 are configured to enable a detection of a photovoltage difference between the scan probe device 14 and the sample 18 due to stress. More specifically, the first light signal 44 and the second light signal 46 correspondingly from the first light-emitting source 40 and the second light-emitting source 42 are configured to irradiate on the sample 18 enabling the detection of a change in local band-gap and thus in the local work function (or equivalently to the change in surface photovoltage) due to local, spatial components of stress that exist in the sample 18. Measuring the change in local work function effectively provides the measure of the change in the local stress level. Various components of stress may be measured on the sample 18 by varying the state of light polarization, angle of incidence, and orientation of the sample which may vary depending on, for example, the material of the sample 18 in accordance with one exemplary embodiment.

In accordance with one exemplary embodiment, the processor of the optical controller 20 is configured for electronically modulating ("chopping") the first light signal 44 and the second light signal 46 in a controlled manner. This technique enhances the sensitivity to the photovoltage (and therefore, stress detection). For example, the first light signal 44 and the second light signal 46 operate in a chopping or pulsing manner such that photovoltage data is taken with the first light-emitting source 40 being on and the second light-emitting source 42 being off, then taking photovoltage data with the second light-emitting source 42 being on and the first light-emitting source 40 being off. This alternating illumination method results in a differential photovoltage in real-time. In an alternative exemplary embodiment, photovoltage data is taken with the first light-emitting source 40 and stored, and then photovoltage data is taken with the second light-emitting source 42 and stored. The differences in the stored photovoltage data are then subtracted from one another resulting in a differential photovoltage.

In accordance with one exemplary embodiment, the scan probe device 14 includes a flexible cantilever 52 with a fine electrically conductive tip 56 suspended over the sample 18. The scan probe device 14 can be any conventional scan probe device generally used in scanning probe microscopy. The electrically conductive tip 56 has a small radius of curvature (e.g., approximately less than 15 nm) at the end of the flexible cantilever 52 in accordance with one embodiment as is known in the art. The scan probe device 14 includes a z-piezo control device 54 configured for mechanically positioning the cantilever 52 in the z-direction, that is, in the vertical direction toward and away from the sample 18. The z-piezo control device 54 is further configured to oscillate the cantilever-tip at approximately a mechanical resonant frequency in accordance with one exemplary embodiment. In one embodiment, the z-piezo control device 54 applies a time varying electrical stimulus to the cantilever-tip with a frequency that is at or approximately near the mechanical resonant frequency of the cantilever 52. The scan probe device 14 is configured to respond when the sample 18 is irradiated with the first light signal 44 and the second light signal 46. More specifically, the cantilever 52 of the scan probe device 14 deflects in response to the differential photovoltage formed between the tip 56 and the sample 18 when the light signals are modulated in an alternating fashion. In accordance with one non-limiting exemplary embodiment, the first light signal 44 and the second light signal 46 each have an irradiating frequency near the mechanical resonant frequency of the cantilever 52 (e.g., 50 kHz) resulting in enhanced sensitivity to the differential photovoltage and thus the local stress state in the sample 18. The local changes in band-gap are related to the change in the local work function of the sample 18 due to stress. The measure of the change in local work function is a function of the position of the scan probe device 18. As such, local stress in the sample 18 can be measured. Different areas of the top surface 30 of the sample 18 may result in different changes in local work function depending on the stress in that local area.

In accordance with one exemplary embodiment, the probe detector assembly 12 suspended over the scan probe device 14 and effectively over the sample 18 is configured for acquiring the topography of each surface line of the sample 18 to capture the topographical image of the sample 18. The topography of each surface line of the sample 18 is characterized by the measurement of the height of the sample 18 along each surface line. The height is measured in angstroms, nanometers, microns, or otherwise. The topography of each surface line of the sample 18 is acquired by moving the sample along the x-axis and y-axis through the stage platform 16 or alternatively, moving the scan probe device 14 along the x-axis and y-axis relative to a stationary mounted sample 18. This same operation is used to measure the change in local work function along the surface line of the sample 18 due to stress and consequently, to characterize the local stress along each surface line of the sample 18 on a 100 nm scale (or less) in accordance with one exemplary embodiment. This is accomplished by irradiating the sample 18 with the first light signal 44 and the second light signal 46 as described above. However, it is contemplated that sensitivity at a scale smaller than a 100 nm scale can be achieved in other exemplary embodiments.

In accordance with one embodiment, the CPU 22 is coupled to the probe detector assembly 12, the probe controller 24 and the power source 26. The CPU 22 may be any conventional processor configured for carrying out the methods and/or functions described herein. In one exemplary embodiment, the CPU 22 comprises a combination of hardware and/or software/firmware with a computer program that, when loaded and executed, permits the CPU 22 to operate such that it carries out the methods described herein. In accordance with one exemplary embodiment, the CPU 22 is configured for determining the topographical image of the sample 18 acquired by the probe detector assembly 12. The CPU 22 is further configured for determining the changes in local work function of the sample 18 by receiving the photovoltage data and differential photovoltage data measured by the probe detector assembly 12. The local stress level or state in the sample 18 on a 100 nm scale (or less) is derived by the measured differential photovoltage.

In accordance with one embodiment, the probe controller 24 is in signal communication with CPU 22 and is configured for controlling the operations of the z-piezo control device 54 to prevent the tip 56 of the scan probe device 14 from damaging the sample 18. In accordance with one embodiment, the probe controller 24 controls the z-piezo control device 54 based on the topography data of the scanned surface line of the sample 18. In other words, the z-piezo control device 54 moves the scan probe device 14 along the z-direction based on hills/valleys and/or trenches that may exist along the surface line of the sample 18. For example, as the tip 56 is moving across the surface line of the sample 18 and faces the beginning of a valley or bump, the probe controller 24 signals the z-piezo control device 54 to adjust the height of the scan probe device 14 to prevent the tip 56 from damaging or smashing into the sample 18, thereby forming a topography feedback loop system between the scan probe device 14, probe detector assembly 12, CPU 22, and probe controller 24. The photovoltage signal is therefore acquired at constant height of the scan probe device above the sample, thereby removing height dependence from the photovoltage data.

In accordance with one exemplary embodiment, the power source 26 is in communication with the CPU and coupled with the sample 18 and scan probe device 14. The power source 26 is configured for generating a biasing voltage (e.g., Kelvin voltage) to actively null the photovoltage difference between the sample 18 and the scan probe device 14 as the scan probe device 14 moves along each surface line of the sample 18 and as the probe detector assembly 12 is measuring the photovoltage differences detected along each surface line of the sample 18. This forms a photovoltage difference feedback loop system between the scan probe device 14, probe detector assembly 12, CPU 22, and the power source 26. Furthermore, this permits the characterization of local stress at various points along each surface line of the sample 18 ensuring the measured work function is determined at constant height as mentioned previously.

In operation, the surface topography of one surface line of the sample 18 is acquired before the photovoltage data is acquired along the same surface line in accordance with one exemplary embodiment. This operation is conducted for each surface line of the sample 18, thus forming a topographical image of the sample 18. The height of the scan probe device 14 is adjusted at a predetermined distance (e.g., 10 nm) from the sample 18 based on the topography data before photovoltage data is acquired in accordance with one embodiment. In other words, a predetermined distance based on the topography data is maintained between the scan probe device 14 and the sample 18 when the first light emitting source 40 and the second light emitting source 42 enables the detection of a photovoltage difference between the scan probe device 14 and the sample 18. Consequently, in the gap between the scan probe device 14 and the sample 18 a photovoltage difference can be detected. It is contemplated that the surface topography of each surface line of the sample 18 is taken before photovoltage data is acquired.

It is contemplated that a display screen (not shown) displays the surface topography of each surface line of the sample 18 and consequently the topographical image of the sample 18 in real-time. It is further contemplated that the display screen displays the photovoltage data along with the measured photovoltage difference between the scan probe device 14 and the sample 18.

Figure 3:
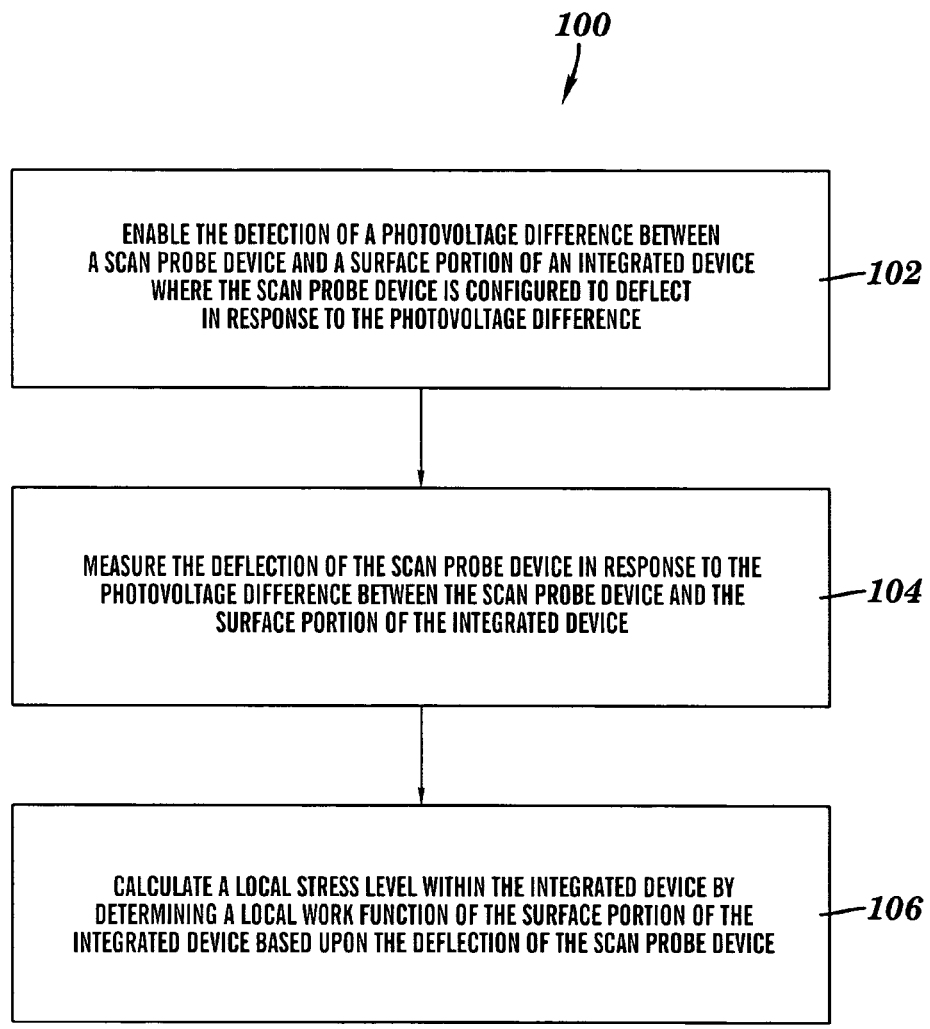
FIG. 3 illustrates a data flow diagram of the scanning Kelvin photovoltage microscopy system implementing a method for detecting local mechanical stress in integrated devices.

In accordance with an exemplary embodiment of the present invention, an exemplary method of detecting mechanical stress in an integrated device is provided and illustrated in FIG. 3. In this exemplary method, initialize operation at block 100. Then, enable the detection of a photovoltage difference between a scan probe device and a surface portion of an integrated device where the scan probe device is configured to deflect based on the photovoltage difference at block 102. In accordance with one exemplary embodiment, the detection of the photovoltage difference is enabled by a first light-emitting source and a second light-emitting source such that each source is elevated at angles $\theta_1$, $\theta_2$ respectively with respect to the integrated device and are both positioned at an angle $\theta_3$ with respect to one another in accordance with one non-limiting exemplary embodiment. Next, measure the deflection of the scan probe device in response to the photovoltage difference between the scan probe device and the surface portion of the integrated device in block 104. The photovoltage difference is measured by a probe detector assembly in accordance with one exemplary embodiment. In block 106, calculate a local stress level within the integrated device by determining a local work function of the surface portion of the integrated device based upon the deflection of the scan probe device. In accordance with one exemplary embodiment, operations in blocks 102-106 are performed at various surface portions along each surface line of the integrated device.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method of detecting mechanical stress in integrated devices, the method comprising:
    enabling the detection of a photovoltage difference between a scan probe device and a surface portion of an integrated device, the scan probe device being configured to move in response to the photovoltage difference;
    irradiating the integrated device with light at a resonant frequency that causes the scan probe device to move in response to the light;
    measuring the movement of the scan probe device in response to the photovoltage difference between the scan probe device and the surface portion of the integrated device; and
    calculating a local stress level within the integrated device by determining a local work function of the surface portion of the integrated device based upon the movement of the scan probe device.

2. The method as in claim 1, wherein irradiating with a first laser signal and a second laser signal at the integrated device enables the detection of the photovoltage difference.

3. The method as in claim 2, wherein the first laser signal and the second laser signal are modulated in an alternating manner.

4. The method as in claim 2, wherein the first laser signal is positioned at a first angle of incidence with respect to the surface portion of the integrated device and the second laser signal is positioned at a second angle of incidence with respect to the surface portion of the integrated device.

5. The method as in claim 4, wherein the first angle of incidence and the second angle of incidence are the same or different from one another.

6. The method as in claim 4, wherein the first angle of incidence and the second angle of incidence is approximately at a Brewster angle with respect to the surface portion of the integrated device.

7. The method as in claim 2, wherein the first laser signal has a third angle of incidence with respect to the second laser signal.

8. The method as in claim 1, wherein the local stress level within the integrated device is measured approximately at a 100-nanometer scale.

9. A method of detecting mechanical stress in integrated devices, the method comprising:
    irradiating with a first laser signal and a second laser signal at a surface portion of an integrated device enabling the detection of a photovoltage difference between a scan probe device and the surface portion of the integrated device, the scan probe device being suspended over the integrated device;
    irradiating the integrated device with light at a resonant frequency that causes the scan probe device to move in response to the light;
    measuring the movement of the scan probe device in response to the photovoltage difference; and
    calculating a local stress level within the integrated device at the surface portion by determining a local work function of the surface portion of the integrated device based on the movement of the scan probe device.

10. The method as in claim 9, wherein the local stress level is derived from the measurement of the movement of the scan probe device in response to the photovoltage difference.

11. The method as in claim 9, wherein the first laser signal is positioned at a first angle of incidence with respect to the surface portion of the integrated device and the second laser signal is positioned at a second angle of incidence with respect to the surface portion of the integrated device.

12. The method as in claim 11, wherein the first angle of incidence and the second angle of incidence is approximately at a Brewster angle.

13. The method as in claim 9, wherein the first laser signal has a third angle of incidence with respect to the second laser signal.

14. The method as in claim 9, wherein the first laser signal couples locally to a first wave vector in the surface portion of the integrated device and the second laser signal couples locally to a second wave vector in the surface portion of the integrated device detecting differing work functions at the surface portion of the integrated device.

15. The method as in claim 9, wherein the photovoltage difference is detected by scanning a tip of the scan probe device, the tip of the scan probe device being applied a time varying electrical stimulus with a frequency at or proximate to the mechanical resonant frequency of the scan probe device.

16. The method as in claim 9 further comprising, applying a biasing voltage between the integrated device and the scan probe device based on the photovoltage difference to actively null the deflection of the scan probe device.

17. The method as in claim 9 further comprising:
acquiring a topographic image of the surface portion of the integrated device; and
maintaining a constant separation distance between the scan probe device and the integrated device based on the topographic image when irradiating with the first laser signal and the second laser signal at the surface portion of the integrated device.

18. An apparatus for detecting mechanical stress in integrated devices, the apparatus comprising:
an integrated device having a surface portion with a local work function;
a scan probe device suspended over the integrated device;
an optical controller configured for enabling the detection of a photovoltage difference between the integrated device and the scan probe device, the scan probe device being configured to move in response to the photovoltage difference, wherein irradiating the integrated device with light at a resonant frequency causes the scan probe device to move in response to the light;
a scan probe detector configured for measuring the movements of the scan probe device in response to the photovoltage difference; and
a processing unit in signal communication with the scan probe detector, the processing unit being configured for calculating a local stress level within the integrated device by determining the local work function of the surface portion of the integrated device based upon the movement of the scan probe device.

19. The apparatus of claim 18, wherein the scan probe device includes a cantilever with a fine tip, the fine tip being configured to oscillate at a resonant frequency, the scan probe device being configured to move along a z-directional plane.

20. The apparatus of claim 18, wherein the optical controller includes a first light-emitting source and a second light-emitting source.

21. The apparatus of claim 20, wherein the first light-emitting source is positioned at a first angle of incidence with respect to the surface portion of the integrated device and the second light-emitting source is positioned at a second angle of incidence with respect to the surface portion of the integrated device.

22. The apparatus of claim 21, wherein the first angle of incidence and the second angle of incidence is approximately at a Brewster angle.

23. The apparatus of claim 20, wherein the first light-emitting source has a third angle of incidence with respect to the second light-emitting source.

24. The apparatus of claim 18, further comprising a power source configured for applying a biasing voltage between the integrated device and the scan probe device based on the photovoltage difference.

25. The apparatus of claim 18, further comprising a probe controller configured for adjusting the height of the scan probe device.

* * * * *

UNITED STATES PATENT AND TRADEMARK OFFICE
CERTIFICATE OF CORRECTION

| | | |
|---|---|---|
| PATENT NO. | : 7,944,550 B2 | |
| APPLICATION NO. | : 12/039830 | |
| DATED | : May 17, 2011 | |
| INVENTOR(S) | : Bumm et al. | |

It is certified that error appears in the above-identified patent and that said Letters Patent is hereby corrected as shown below:

On the title page, item [54] and column 1, line 1:

Please delete title: "System and Method for Detecting Local Mechanical Stress In Integreated Devices" and replace with title: "System and Method for Detecting Local Mechanical Stress in Integrated Devices".

Title Page Item [75] Please delete Inventor No. 2 "Daminda Dahayanaka" and replace with Daminda H. Dahanayaka Signed and Sealed this
Thirteenth Day of September, 2011

David J. Kappos
*Director of the United States Patent and Trademark Office*